United States Patent [19]

Dapo

[11] Patent Number: 5,175,674
[45] Date of Patent: Dec. 29, 1992

[54] ELECTROLYTE CONTAINING A NOVEL DEPOLARIZER AND AN ELECTROLYTIC CAPACITOR CONTAINING SAID ELECTROLYTE

[75] Inventor: Roland F. Dapo, Columbia, S.C.

[73] Assignee: North American Philips Corporation, New York, N.Y.

[21] Appl. No.: 856,776

[22] Filed: Mar. 24, 1992

[51] Int. Cl.⁵ ............................................. H01G 9/02
[52] U.S. Cl. .................................. 361/525; 252/62.2
[58] Field of Search ........ 361/525, 526, 527, 504–506; 252/62.2

[56] References Cited

U.S. PATENT DOCUMENTS

| | | | |
|---|---|---|---|
| 4,473,864 | 9/1984 | Heusden | 361/327 |
| 4,835,660 | 5/1989 | Dapo | 361/504 |
| 4,860,169 | 8/1989 | Dapo | 361/506 |
| 4,885,660 | 12/1989 | Dapo | 361/506 |

Primary Examiner—Donald A. Griffin
Attorney, Agent, or Firm—Norman N. Spain

[57] ABSTRACT

An electrolyte adapted for use as fill electrolytes in eletrolytic capacitors having aluminum cathodes and anodes useful in a low to high voltage operating range which electrolyte contains an improved non-toxic depolarizer.

18 Claims, 4 Drawing Sheets

ELECTROLYTE CONTAINING A NOVEL DEPOLARIZER AND AN ELECTROLYTIC CAPACITOR CONTAINING SAID ELECTROLYTE

BACKGROUND OF THE INVENTION

The operating life of an electrolytic capacitor frequently is limited by the production of gas within the electrolyte employed in the capacitor. As a result of the formation of this gas, the equivalent series resistance (ESR) increases to an undesirable value within a comparatively short time. Thus the life of the capacitor is shortened.

It is known that production of the gas may result from a number of different mechanisms. One of these mechanisms is that formed by the thermal decomposition of the electrolyte. Another mechanism is due to the chemical reaction of the cathode, for example, aluminum with the electrolyte to produce hydrogen gas. It is also known that the electrochemical reduction of the electrolyte at the cathode produces an increase ESR in proportion to the amount of the gas produced at the cathode.

Employing nitraromatic compounds as cathode depolarizers is known to prevent this gas production. It has been found however that nitroaromatic compounds limit the operating voltages of the aluminum electrolytic capacitors and thus they are not useful depolarizers for high volt capacitors.

It has also been found that the nitroaromatic compounds are hazardous materials since they are toxic and may be absorbed through intact skin. For this additional reason, it is desirable that the nitroaromatic compounds be replaced.

Clark, U.S. Pat. No. 2,089,683, shows an electrolytic capacitor, the electrolyte of which contains a straight chain aliphatic acid containing up to 4 carbon atoms, an example in this patent is shown to be propionic acid. There is no suggestion that these acids in any way act as depolarizers.

Anderson, U.S. Pat. No. 3,539,881 shows an electrolytic capacitor in which the electrolyte employed contains monocarboxylic acid of less than 7 carbons, which acids are liquids. As examples of acids that are employed are shown propenoic, butenoic and pentenoic acids. However there is no suggestion in this patent that these acids act as depolarizers.

Belloni, U.S. Pat. No. 3,611,056 shows an electrolyte for an electrolytic capacitor containing an aliphatic polyhydroxy carboxylic acid for example citric acid. However, here too there is no suggestion that this acid functions as a depolarizer.

European Patent Application 0,246,825 shows electrolytic capacitors, the electrolytes of which contains an aliphatic carboxylic acid and shows as examples such mono-unsaturated acids as crotonic acid, acrylic acid, octenoic acid and decenoic acid. Here, too, there is no suggestion that any of the acids disclosed therein are used as depolarizers.

SUMMARY OF THE INVENTION

It is a principle object of this invention to provide an electrolyte particularly adapted for use as fill electrolytes in electrolytic capacitors having aluminum cathodes and anodes useful in a low to high voltage operating range which electrolyte contains an improved non-toxic depolarizer.

According to the invention it has been found that the life of an electrolytic capacitor comprising aluminum cathode and anode numbers is significantly increased by employing as an electrolyte in such a capacitor an electrolyte containing an aliphatic conjugated diene monocarboxylic acid, non-metallic salts, amides or esters thereof in an amount up to 20% by weight of the electrolyte.

DETAILED DESCRIPTION OF THE INVENTION

Figure 1:
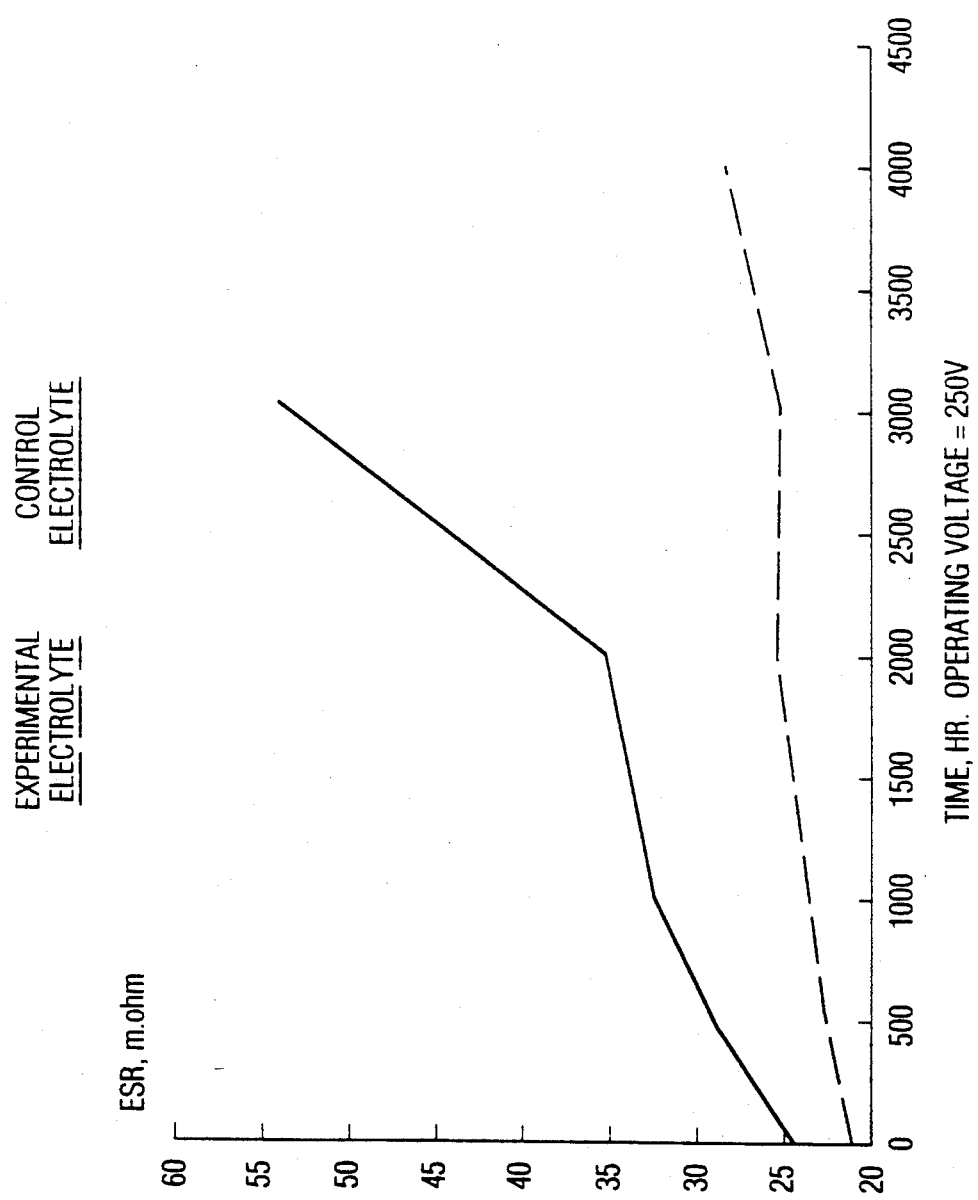
FIGS. 1, 2, 3 and 4 are graphs comparing the operating life of electrolytic capacitors provided with an electrolyte of the invention with that of an electrolyte of similar construction but containing electrolytes that have previously been employed.

While improved results have been found to occur with electrolytes containing aliphatic conjugated diene monocarboxylic acid, non-metallic salts, amides or esters thereof, it has been found that particularly improved results are achieved by use of electrolytes containing a sorbate compound particularly sorbic acid, an amine salt or an ammonium salt of sorbic acid.

In this regard, it should be noted that the above-mentioned Belloni U.S. Pat. No. 3,611,056 mentions the use of sorbic acid in an electrolyte for an electrolytic capacitor. However, this appears to be a typographical error since the "sorbic acid" is defined as a carboxylic acid which must have two vicinal hydroxy groups, column 3, lines 10-19.

Since sorbic acid has no hydroxy groups it is apparent that the term "sorbic acid" employed in column 3, line 19 is a typographical error. Instead most likely ascorbic acid is meant since this acid has two vicinal hydroxy groups.

The amount of the sorbic acid or derivatives thereof that may be present in the electrolyte may range from about 0.10-20 weight percent. When the sorbic acid is employed the amount of sorbic acid preferably may range from about 0.1 to about 15.0 weight percent.

The solvents that may be employed include ethylene glycol, propylene glycol, 1-methyl-2-pyrrolidone, gamma-butynorlactone dimethylformamide and dimethylacetamide and the mixtures of these materials. However, because of their relatively low cost and lack of toxicity, ethylene glycol and propylene glycol are preferred.

In addition to the already mentioned sorbate compound, the electrolyte may contain additional carboxylic acids examples of which are acetic acid, propionic acid, azelaic acid, sebacic acid, adipic acid, itaconic acid, maleic acid, phthalic acid and benzoic acid in an amount of about 0.50-20.00 weight percent and in an amount such that the mol. % of the sorbate compound of the combined amount of the sorbate compound and the additional acid is 10-100 mol. %.

In addition, the electrolytes of the invention preferably contain up to 0.02 wt. % of phosphoric acid. To neutralize the phosphoric acid and other acids the electrolyte contains a sufficient amount of ammonia or an amine, for example dimethylamine, so that the pH of the electrolyte is between 7.0-10.0.

To prevent foaming an anti-foaming agent such as di-2-ethylhexyl azelate might be employed. The azelate preferably is employed in an amount of about 0.01 to 0.25 wt. % depending on the amount of the Dimer Acid that is employed.

Further the electrolytes generally contain about 5.0 to 8.00 wt. % of water.

Particularly good results have been achieved with the use of an electrolyte comprising about 85 to 86 wt. % of ethylene glycol, 5.00-7.00 wt. % of water, 0.60-0.80 wt. % of Dimer Acid, 0.04-0.06 wt. % of di-2-ethylhexyl azelate, 0.015-0.03 wt. % of phosphoric acid, 3-7 wt. % Azelaic Acid, 1-2 wt. % of sorbic acid and 2.50-3.00 wt. % of dimethylamine.

The invention will now be described in greater detail with reference to the following example and figures of the drawing:

EXAMPLE

An electrolyte was prepared by mixing the following ingredients:

| Ethylene glycol | 84.50 wt. % |
|---|---|
| Water | 6.00 |
| * Dimer Acid | 0.70 |
| Di-2-ethylhexyl Azelate | 0.05 |
| 85% Phosphoric Acid | 0.02 |
| Azelaic Acid | 4.50 |
| Sorbic Acid | 1.50 |
| Dimethylamine | 2.75 |

* Dimer Acid is a trade name for dimerized oleic acid sold by Emery Industries.

The ingredients were heated to 65° C.-75° C. while stirring to dissolve all solids and the pH was adjusted to 7.5 to 8.5 if necessary. The resistivity of the resultant electrolyte was found to be about 330 ohm.cm at 30° C.

Capacitors were prepared by impregnating a paper spacer separating aluminum anode and cathode members with the electrolyte of the example and with previously employed (control) electrolytes.

The lives of these capacitors were determined by measuring the increase of their ESR (equivalent series resistance) values as a function of time and the results are shown in the graphs of FIGS. 1, 2, 3, and 4.

FIG. 1 shows the change in ESR as a function of time for a capacitor employing the electrolyte of the example 1 as compared to that employing a control electrolyte when the capacitors are held at 105° C. and 250 V.

Figure 2:
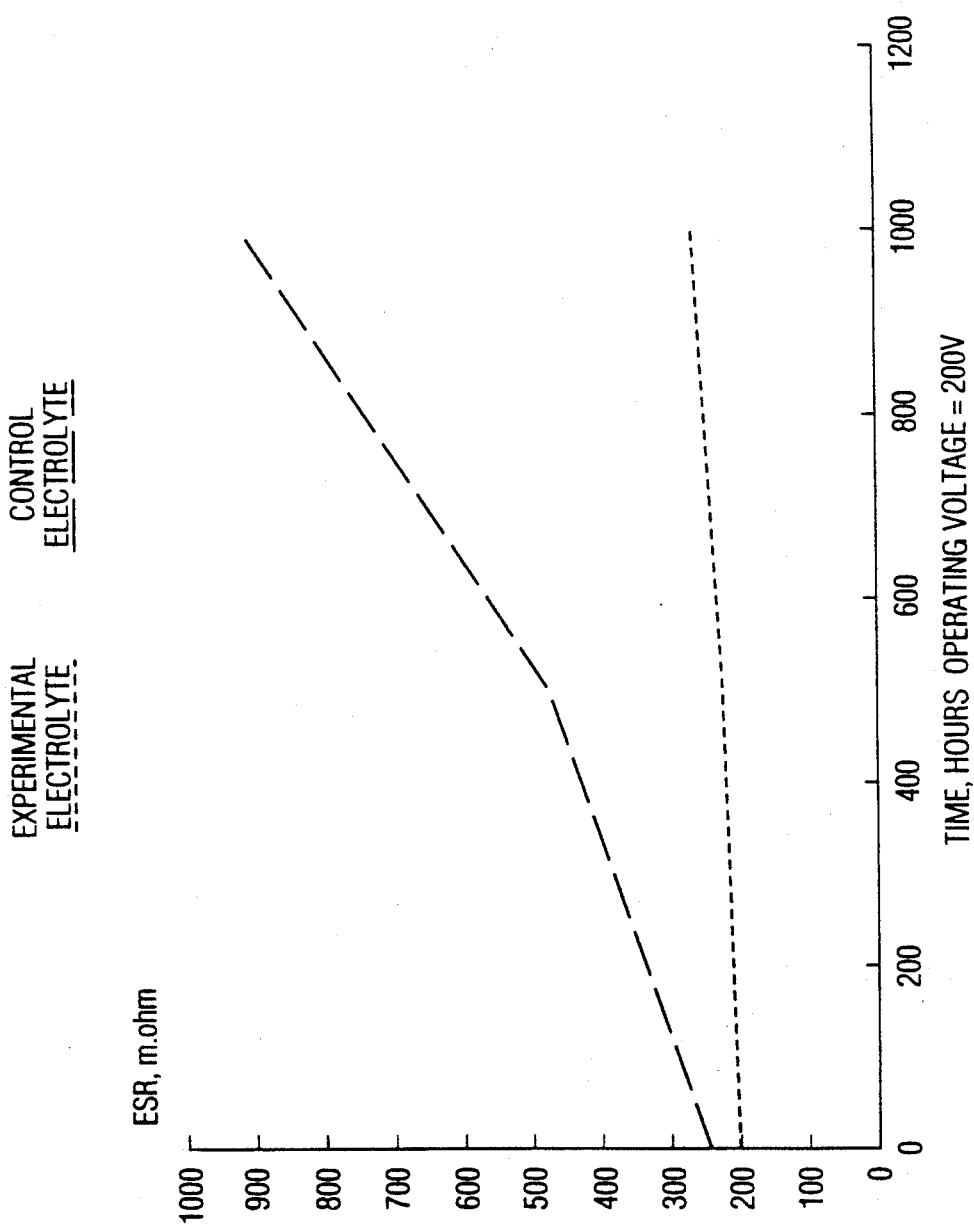

FIG. 2 shows a similar comparison but with capacitors rated for 200 V.

Figure 3:
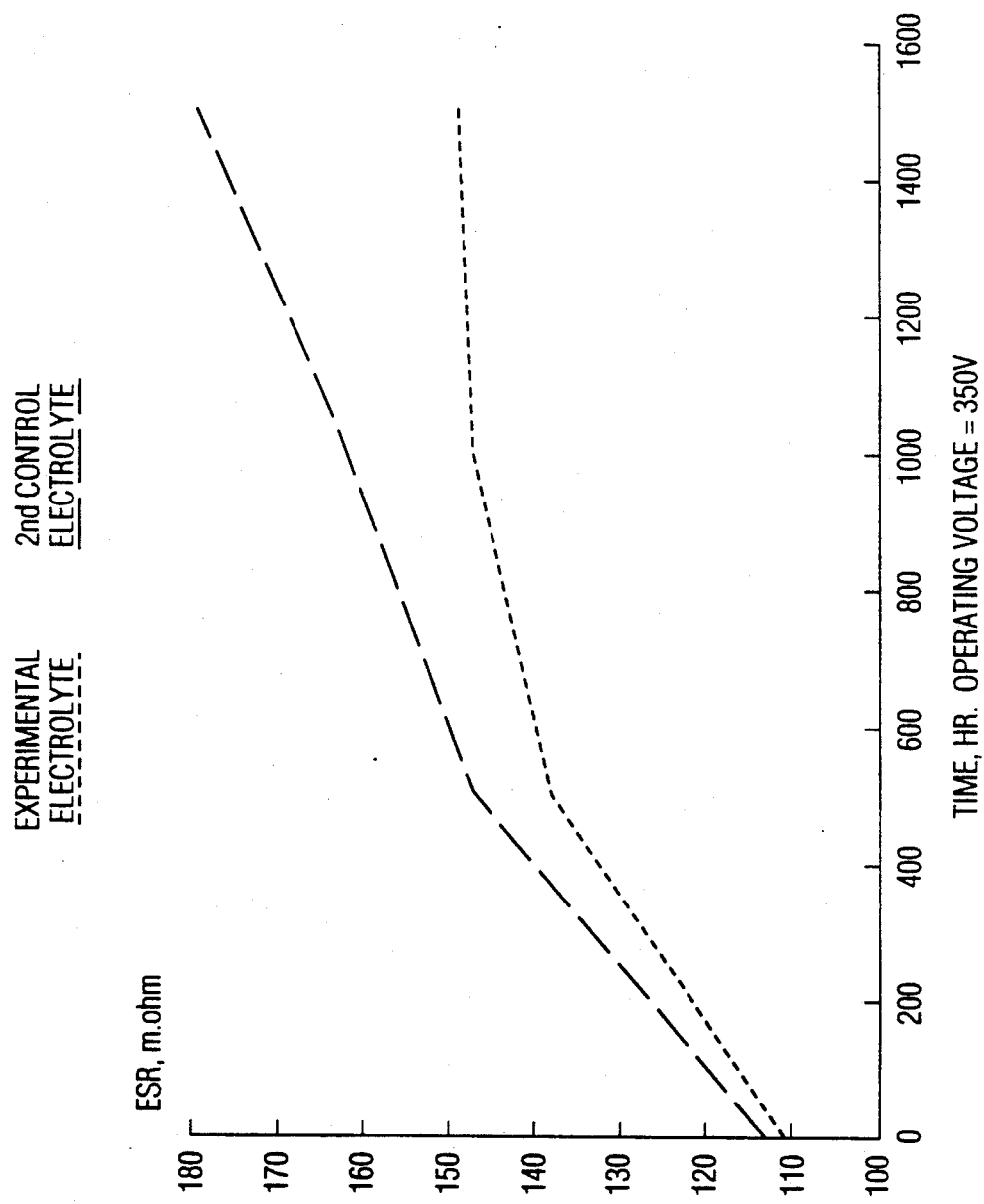

FIG. 3 shows a similar comparison but with a different control electrode and at a voltage of 350 V.

The control electrolytes shown in the graphs of FIGS. 1-3 do not contain a depolarizer.

Figure 4:
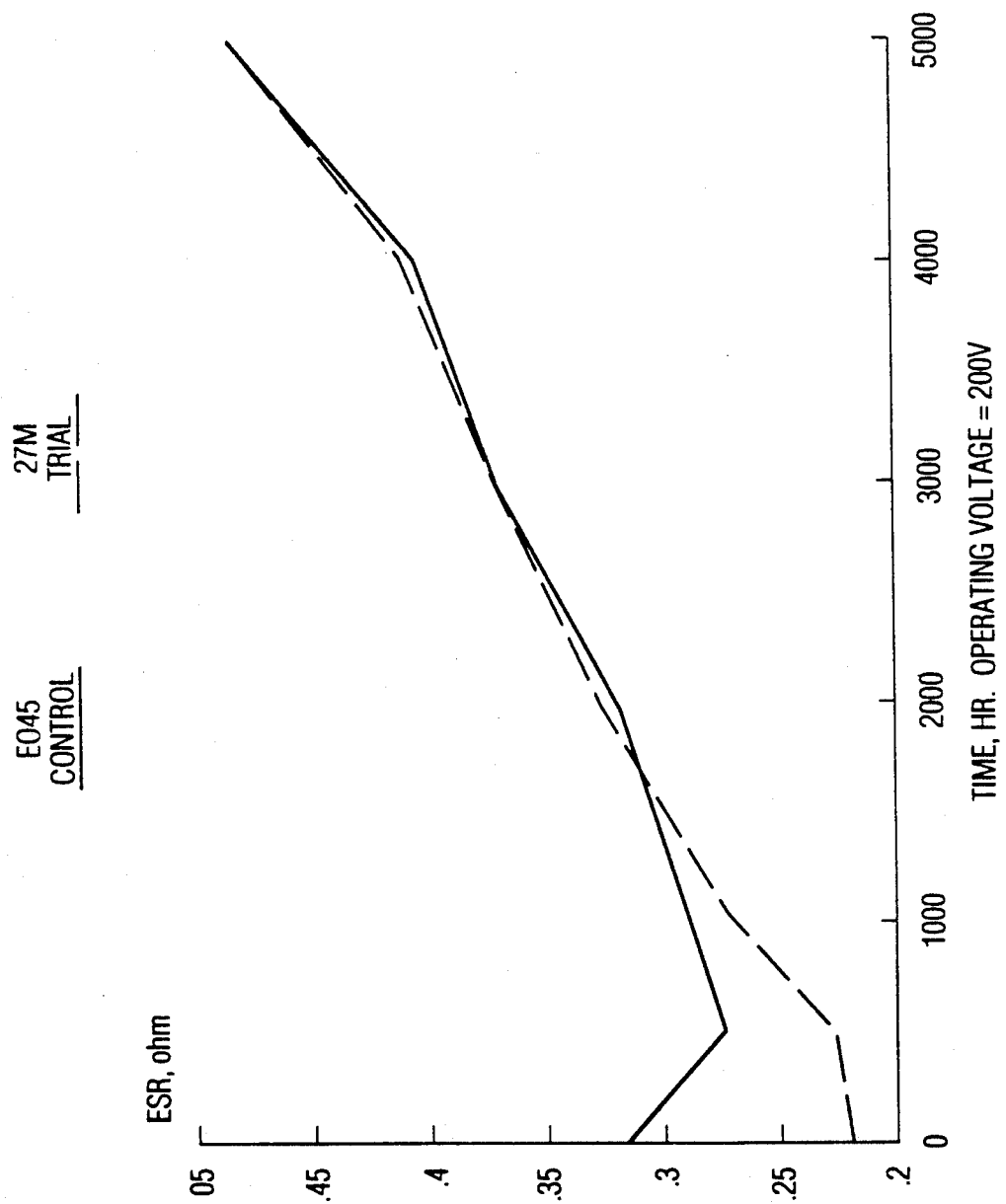

FIG. 4 shows similar comparison but at a voltage of 200 V and with a control electrolyte containing a nitroaromatic cathode depolarizer.

The aluminum content of cathodes of the capacitors is 98 wt. %.

As shown in the graphs, employment of the electrolyte of the invention provided a significant increase in the lives of the capacitors as compared to the lives of capacitors of the invention employing electrolytes not containing depolarizers and lives essentially the same as the lives of capacitors provided with electrolytes containing the toxic nitroaromatic depolarizers of the prior art.

What is claimed is:

1. An electrolytic capacitor, particularly adapted for use in a low to high voltage operating range, said capacitor comprising aluminum cathode and anode members separated by an insulating spacer impregnated with an electrolyte containing a member of the group consisting of an aliphatic conjugated diene monocarboxylic acid, non-metallic salts thereof, amides, and esters thereof in an amount up to 20% by weight.

2. The electrolytic capacitor of claim 1 wherein the electrolyte contains up to 12% by weight of Dimer Acid.

3. An electrolytic capacitor, particularly adapted for use in a low to high voltage operating range, said capacitor comprising aluminum cathode and anode members separated by an insulating spacer impregnated with an electrolyte containing a member of the group consisting of sorbic acid, non-metallic salts thereof and amides thereof in an amount up to 20 % by weight.

4. The electrolytic capacitor of claim 3 wherein the electrolyte comprises sorbic acid.

5. An electrolytic capacitor particularly adapted for use in a low to high operating range, said capacitor comprising aluminum anode and cathode members separated by an insulating spacer impregnated with an electrolyte comprising a solvent selected from the group consisting of ethylene glycol and propylene glycol, about 0.10-20 weight percent of a sorbate compound selected from the group consisting of sorbic acid, sorbic acid amides and non-metallic salts of sorbic acid and sorbate esters, a carboxylic acid selected from the group consisting of acetic acid, propionic acid, azelaic acid, sebacic acid, adipic acid, itaconic acid, maleic acid, phthalic acid and benzoic acid, said carboxylic acid being present in an amount of about 0.50 to 20.0 wt. % and the mole % of the sorbate compound of the combined amount of the sorbate compound and the carboxylic acid being about 10 to 100 mole %, 2-20 wt. % of water, up to 0.02 wt. % of phosphoric acid and an amine or ammonia in an amount such that the pH of said electrolyte is between 7.0-10.0.

6. The electrolyte capacitor of claim 5 wherein the sorbate compound is sorbic acid.

7. The electrolytic capacitor of claim 6 wherein the electrolyte comprises about 0.10-15.0% wt. % of sorbic acid.

8. The electrolytic capacitor of claim 5 wherein the solvent is ethylene glycol.

9. The electrolytic capacitor of claim 8 wherein the amine is dimethylamine.

10. The electrolytic capacitor of claim 5 wherein the electrolyte contains 0.25-6.0 wt. % of Dimer Acid.

11. The electrolytic capacitor of claim 10 wherein the electrolyte contains about 0.01-0.25 wt. % of di-2-ethylhexyl azelate.

12. The electrolytic capacitor of claim 11 wherein the aluminum content of the aluminum cathode is about 98-100 wt. %.

13. An electrolytic capacitor particularly adapted for use in a low to high operating range, said capacitor comprising aluminum anode and cathode members separated by an insulating spacer impregnated with an electrolyte comprising a polar solvent, about 0.10-20 weight percent of a sorbate compound selected from the group consisting of sorbic acid, sorbic acid amides and non-metallic salts of sorbic acid, a carboxylic acid selected from the group consisting of acetic acid, propionic acid, azelaic acid, sebacic acid, adipic acid, itaconic acid, maleic acid and benzoic acid, said carboxylic acid being present in an amount of about 0.50 to 20.0 wt. % and the mole % of the sorbate compound of the combined amount of the sorbate compound and the carboxylic acids being about 10 to 100 mole %, 2-20 wt. % of water, up to 0.02 wt. % of phosphoric acid and an amine or ammonia in an amount such that the pH of said electrolyte is between 7.0 and 10.0.

14. The electrolytic capacitor of claim 7 wherein the electrolyte contains 0.25-6.0 wt. % of Dimer Acid.

15. The electrolytic capacitor of claim 14 wherein the electrolyte contains to about 0.01-0.20 wt. % of di-2-ethylhexyl azelate.

16. The electrolytic capacitor of claim 15 wherein the aluminum content of the aluminum cathode is about 98-100 wt. %.

17. An electrolytic capacitor, particularly adapted for use in a low to high voltage operating range, said capacitor comprising aluminum anode and cathode members separated by an insulating spacer impregnated with an electrolyte comprising about 85 to 86 wt. % of ethylene glycol 5.00-7.00 wt. % of water, 0.60-0.80 wt. % of Dimer Acid, 0.04-0.06 wt. % of di-2-ethylhexyl azelate, 0.015-0.03 wt. % of phosphoric acid, 4.00-5.00 wt. % of azelaic acid, 1-2 wt. % of sorbic acid and 2.50-3.00 wt. % of dimethylamine.

18. The capacitor of claim 17 wherein the aluminum content of the aluminum anode is about 97.5-100 wt. %.

* * * * *